(12) United States Patent
Domonkos

(10) Patent No.: US 12,376,942 B2
(45) Date of Patent: Aug. 5, 2025

(54) LIP AND CHEEK EXTENDER

(71) Applicant: Ivoclar Vivadent AG, Schaan (LI)

(72) Inventor: Horvath Domonkos, Jestetten (DE)

(73) Assignee: Ivoclar Vivadent AG, Schaan (LI)

( * ) Notice: Subject to any disclaimer, the term of this patent is extended or adjusted under 35 U.S.C. 154(b) by 528 days.

(21) Appl. No.: 17/439,966

(22) PCT Filed: Mar. 20, 2020

(86) PCT No.: PCT/EP2020/057755
§ 371 (c)(1),
(2) Date: Sep. 16, 2021

(87) PCT Pub. No.: WO2020/193398
PCT Pub. Date: Oct. 1, 2020

(65) Prior Publication Data
US 2022/0249200 A1    Aug. 11, 2022

(30) Foreign Application Priority Data

Mar. 22, 2019   (DE) .......................... 102019203954.5
Mar. 22, 2019   (DE) .......................... 102019203970.7
Sep. 11, 2019   (DE) .......................... 102019213802.0

(51) Int. Cl.
*A61C 5/90*     (2017.01)
*A61C 19/00*    (2006.01)

(52) U.S. Cl.
CPC ............... *A61C 5/90* (2017.02); *A61C 19/00* (2013.01)

(58) Field of Classification Search
CPC .. A61C 19/00; A61C 5/90; A61C 5/80; A61C 5/82; A61C 17/10
See application file for complete search history.

(56) References Cited

U.S. PATENT DOCUMENTS 5,499,917 A * 3/1996 Erickson ................... A61C 5/82
                                                      433/137
10,818,198 B2  10/2020 Fellus
(Continued)

FOREIGN PATENT DOCUMENTS

CN        2850556 Y      12/2006

OTHER PUBLICATIONS

Office Action issued by European Patent Office on Mar. 20, 2023 for Patent Application No. EP 20 715 779.3, 5 pages.

*Primary Examiner* — Cris L. Rodriguez
*Assistant Examiner* — Sydney J Pulvidente
(74) *Attorney, Agent, or Firm* — Ann M. Knab; Thad McMurray

(57) ABSTRACT

The invention relates to a covering device for covering the lips and labial angles and for holding the lips, cheeks and labial angles away from the rows of teeth in the mouth of a patient which comprises an elastic lip clamping element for external contact with the mouth opening, at least one elastic vestibular clamping element for inserting into the oral vestibule of the mouth of the patient and a film connecting the clamping elements, wherein the clamping elements are arranged along two opposite end regions of the film such that the inserted covering device is open towards the mouth cavity, wherein the vestibular clamping element comprises at least one section which extends in the sagittal direction anterior to the vestibular fold when the covering device is inserted.

17 Claims, 9 Drawing Sheets

(56) References Cited

U.S. PATENT DOCUMENTS

| | | |
|---|---|---|
| 2004/0097795 A1 | 5/2004 | Horvath |
| 2006/0223028 A1 | 10/2006 | Horvath |
| 2008/0064001 A1 | 3/2008 | Dorfman et al. |
| 2008/0153058 A1 | 6/2008 | Horvath |
| 2010/0119989 A1 | 5/2010 | Raybuck |
| 2017/0196659 A1* | 7/2017 | Müller .................... A61C 5/90 |
| 2020/0188060 A1* | 6/2020 | Mueller ................... A61B 1/32 |

* cited by examiner

LIP AND CHEEK EXTENDER

CROSS-REFERENCE TO RELATED APPLICATIONS

This application is a National Stage application of International patent application No. PCT/EP2020/057755 filed on Mar. 20, 2020, which claims priority to DE patent application No. 102019203970.7 filed on Mar. 22, 2019, DE patent application No. 102019203945.5 filed on Mar. 22, 2019, and DE patent application No. 102019213802.0 filed on Sep. 11, 2019, all the disclosures of which are incorporated herein by reference in their entirety.

FIELD OF THE INVENTION

The invention relates to an improved lip and cheek expander in the form of a covering device for covering the lips and labial angles and for holding the lips, cheeks and labial angles away from the rows of teeth in the mouth of a patient.

BACKGROUND OF THE INVENTION

Covering devices for holding the lips, cheeks and labial angles away from the rows of teeth in the mouth of a patient are known as cheek retractors, retracting hooks or spreading clamps. Additionally, WO 03/051185 A1 and DE 10 2014 109 023 A1 describe a device in which not only the lips, cheeks and labial angles are held away from the rows of teeth in the mouth of a patient but also the lips and labial angles are covered simultaneously. Devices of this kind are marketed e.g. using the brand name OptraGate® by Ivoclar Vivadent AG and comprise two flexible rings as clamping frames which are connected to each other by a cover film. One of the two clamping frames is inserted completely into the oral vestibule to fix the cover film intraorally.

Covering devices of this kind serve among others to enable the dentist to access the mouth cavity more easily. The lips of the patient are spread and pulled apart by the combined effect of—ring-shaped—clamping elements and a film extending therebetween such that the mouth opening is substantially enlarged without the patient having to open the mouth more widely.

Prior art covering devices of this type often lead to painful pressure marks on the mucous membrane of the alveolar bone, in particular in the region of the canine teeth as the intraorally positioned clamping element is pressed to the alveolar bone by the strong lip pressure. This applies particularly to the lower jaw but pressure marks of this type may also arise at the upper jaw.

A further problem in the production of lip and cheek expanders, i.e. in the local diction, of the covering devices according to prior art is the plurality of sizes which have to be kept ready for the different mouth sizes of the patients. The "Optragates" are delivered in a shrink-wrapped manner. Due to the special requirements to the film (elasticity, flexibility, material strength, tensile strength) durability is limited even in the shrink-wrapped state and is e.g. a few months.

As a result, regularly purchased and stored Optragates become unusable after the maximum storage period and have to be disposed of. Even making available only 3 or 4 sizes leads to unnecessary costs and superfluous disposal problems.

SUMMARY OF THE INVENTION

In contrast, the present invention is based on the task of providing an improved covering device of the generic kind according to the claims, which prevents or at least considerably decreases pressure marks on the mucous membrane of the alveolar bone and thus considerably increases wearing comfort of the device such that acceptance of the covering device is increased and/or storage costs are minimized.

The present invention solves the underlying technical problem by means of a covering device.

Inventively, a covering device for covering the lips and labial angles and for holding the lips, cheeks and labial angles away from the rows of teeth in the mouth of a patient is provided which comprises an elastic lip clamping element for external contact with the mouth opening, at least one elastic vestibular clamping element for inserting into the oral vestibule of the mouth of the patient and a film connecting the clamping elements, wherein the clamping elements are arranged along two opposite end regions of the film such that the inserted covering device is open towards the mouth cavity. Preferably, the film offers substantially no resistance to bending compared to stretching. At least one intraoral section of the vestibular clamping element is suited to be inserted, in the elastically deformed state, into a region of the oral vestibule of the patient and to fix the film intraorally such that, when the covering device is inserted, the film extends between the extraoral lip clamping element and the substantially intraoral vestibular clamping element in contact with the lips and labial angles therearound and is suited to exert substantially evenly distributed planar compressive forces to the lips and labial angles which push away the lips, cheeks and labial angles from the teeth and the alveolar bone and pretension the mouth opening circularly into an open position. Even in the inserted state, the covering device allows for closing the mouth. According to the invention, the vestibular clamping element comprises at least one section which extends, when the covering device is inserted, in the sagittal direction anterior to the oral vestibule, in particular anterior to the vestibular fold, or also anterior to the labial frenulum. Herein, "anterior to the oral vestibule" of course refers to the lowest point of the oral vestibule, i.e. the vestibular fold.

According to the invention, it is provided that the vestibular clamping element comprises at least one section curved towards the lip clamping element, i.e. in particular in the anterior direction, said curved section extending in particular anterior to the vestibular fold and/or anterior to the labial frenulum when the covering device is inserted.

Preferably, the at least one section of the vestibular clamping element which extends in the sagittal direction anterior to the vestibular fold when the device is inserted is a section which is curved in the anterior direction, i.e. extending closer to the lip clamping element.

It was surprisingly found that a corresponding design of the vestibular clamping element in which one section of the vestibular clamping element is shaped such that it extends in the sagittal direction anterior to the vestibular fold or anterior to the labial frenulum and in this connection is curved preferably in the anterior direction leads to this section not pressing onto the mucous membrane of the alveolar bone and thus preventing pressure sores and irritations at the corresponding places, but still simultaneously the intraorally extending remaining sections, the clamping sections of the vestibular clamping element, are enough to sufficiently fix the covering device intraorally. This does not only hold true for the open but even for the closed mouth.

In a preferred embodiment, when the covering device is inserted, the at least one section of the vestibular clamping element rests only just intraorally or extraorally or in between e.g. on the lip of the patient, in the transition area between intraoral and extraoral.

In this respect, in a preferred embodiment the at least one section of the vestibular clamping element rests on the lip or outside of the lip when the device is inserted.

Unless stated otherwise, the "at least one section of the vestibular clamping element" in the present description refers to the section of the vestibular clamping element which, when the covering device is inserted, extends in the sagittal plane anterior to the vestibular fold and is preferably curved in the anterior direction. This means that this section of the vestibular clamping element does not extend in the lowest region of the oral vestibule but extends offset compared to the extension of the oral vestibule, e.g. along the lip or outside of the lip, as a result of the plastic design of the vestibular clamping element This means that it may be provided that this section which is configured as an indentation does not extend in the lowest region of the oral vestibular but contacts the inner region of the lip and is thus still positioned intraorally. Alternatively and preferably it may be provided that the at least one section extends extraorally. In this embodiment the vestibular clamping element comprises at least one intraorally extending section and at least one extraorally extending section. This means that in this embodiment the extension of the vestibular clamping element crosses the lip or at least rests thereon extensively.

In particular when the mouth is open wide there is a danger of contact between the vestibular clamping element and the jaw mucosa. Even if e.g. in this state the mucous membrane of the lip (ventral margin of the oral vestibule), the vestibular fold and the mucous membrane of the jaw bones (dorsal margin of the oral vestibule) rest on one another closely, the indentation as a bulging of the vestibular clamping element and in particular also a web prevent the vestibular clamping element to contact the mucous membrane of the jaw bone in the anterior region. Thus, no pressure marks can be caused thereat. The bulging of the vestibular clamping element deforms the elastic lip at this place in a deterring manner, i.e. to the anterior.

Additionally, a particular advantage arises from the configuration of the indentation at a place at which the prior art covering devices protrude into the fold and possibly rest thereon. As a result of the indentation, the respective place of the clamping element is shifted obliquely to the top or to the mouth opening/anteriorly. There, the mucous membrane of the lips is very elastic such that it tends to move to the anterior which pushes the clamping element further away from the mucous membrane of the alveolar process.

In connection with the present invention, an "anteriorly curved section" preferably means that the extension extends in the direction of the lip clamping element as it is completely outside of the mouth and thus anterior to the vestibular clamping element when the covering device is in the inserted state, In connection with the present invention the "lip clamping element" refers to the clamping element which is positioned extraorally completely. In connection with the present invention the "vestibular clamping element" refers to the clamping element which is positioned intraorally at least partially.

The at least one section of the vestibular clamping element extends preferably in the region of the incisors when the covering device is inserted. The at least one section of the vestibular clamping element extends particularly preferably in the region of the canine teeth and the incisors when the covering device is inserted.

It becomes apparent that the pressure of prior art clamping elements is particularly large in the region of canine teeth and incisors and that here particularly bad pressure sores on the mucous membrane are formed particularly fast. Thus, the at least one section of the vestibular clamping element which extends substantially in the sagittal direction anterior to the vestibular fold when the covering device is inserted is positioned preferably such that it extends in the region of the incisors, particularly preferably in the region of the incisors and canine teeth and thus leads to pressure relief at the otherwise particularly strongly strained pressure points of the mucous membrane in contact with the alveolar bone.

Advantageously, the at least one section of the vestibular clamping element and thus preferably the entire covering device does preferably not contact the mucous membrane, which covers the jaw bone, in the front section.

It was found surprisingly that in spite of this advantageous pressure relief pressure is not amplified in the other regions of the vestibular clamping element, particularly not in the regions in the area of the oral vestibule.

The regions of the mucous membrane not resting on bones are used increasingly for the function of supporting and bearing the inventive covering device, which is not considered uncomfortable by the patient at all. This holds particularly true for the embodiment as claimed in claim 17.

This increases acceptance of the inventive covering device considerably, enabling the dentist to better access the treatment area and have less time-related stress.

If only one section of the vestibular clamping element is provided which extends substantially in the sagittal direction anterior to the vestibular fold, i.e. closer to the lip clamping element, when the covering device is inserted, it may be positioned either in the region of the lower jaw or in the region of the upper jaw. Preferably, this one section is positioned in the region of the lower jaw as the occurrence of pressure sores is more severe here than in the region of the upper jaw when conventional covering devices are used. Of course, it may be provided selectively to position it in the upper jaw region.

In a preferred embodiment the at least one section of the vestibular clamping element extends in the region of the incisors of the lower jaw when the covering device is inserted.

In a preferred embodiment, the vestibular clamping element comprises two sections which, when the covering device is inserted, in particular when viewed in the sagittal direction, extend to the anterior of the vestibular fold.

In a preferred embodiment, the at least one section of the vestibular clamping element extends in the region of the canine teeth and the incisors of the lower jaw when the covering device is inserted.

It is preferably provided that the covering device comprises a vestibular clamping element which comprises two sections which extend in substantially the sagittal direction anterior to the vestibular fold, particularly curved in the anterior direction, when the covering device is inserted. In this connection, the one section which extends in the sagittal direction anterior to the vestibular fold extends preferably in the region of the incisors, preferably of the canine teeth and the incisors, of the lower jaw, and the other section which extends in the sagittal direction anterior to the vestibular fold when the covering device is inserted extends in the region of the incisors, in particular in the region of the canine teeth and the incisors, in the region of the upper jaw.

In a preferred embodiment, when the covering device is inserted, the first section extends in the region of the canine teeth and incisors of the lower jaw and the second section extends in the region of the canine teeth and incisors of the upper jaw.

In a further preferred embodiment the vestibular clamping element is configured as a clamping frame, in particular as a clamping ring, which is shaped plastically three-dimensionally.

The plastic three-dimensional design makes it possible to achieve the inventive extension of the vestibular clamping element, such as optionally the lip clamping element, wherein the elastic material of the clamping elements makes them still flexible such that the covering device may be used in and at the mouth.

In a preferred embodiment the vestibular clamping element is spaced apart from the lip clamping element by 0 mm to 30 mm in the region of the at least one section when the covering device is inserted.

In a preferred embodiment the vestibular clamping element is spaced apart from the lip clamping element by 0 mm when the covering device is inserted, which means that the clamping elements are in contact with one another at one or two points, or are even connected to one another at these one or two points.

In a preferred embodiment the vestibular clamping element is spaced apart from the lip clamping element by more than 0 mm to 30 mm in the region of the at least one section when the covering device is inserted. In a preferred embodiment the vestibular clamping element is spaced apart from the lip clamping element by 0.1 mm to 30 mm in the region of the at least one section when the covering device is inserted. In a preferred embodiment the vestibular clamping element is spaced apart from the lip clamping element by 25 mm at most in the region of the at least one section when the covering device is inserted. In a preferred embodiment the vestibular clamping element is spaced apart from the lip clamping element by 20 mm at most in the region of the at least one section when the covering device is inserted. In a preferred embodiment the vestibular clamping element is spaced apart from the lip clamping element by 15 mm at most in the region of the at least one section when the covering device is inserted.

In a preferred embodiment the vestibular clamping element is spaced apart from the lip clamping element up to 30 mm in the region of the at least one section when the covering device is inserted.

In a preferred embodiment the lip clamping element comprises at least one section which is curved in the sagittal direction toward the at least one section of the vestibular clamping element when the covering device is inserted.

Such a section of the lip clamping element is preferably at the top or bottom, i.e. in the region of nose or chin, when the covering device is inserted. This is advantageous as the covering device does not cover nose or chin. This means that this section of the lip clamping element is preferably opposite the at least one section of the vestibular clamping element.

In a particularly preferred embodiment the lip clamping element comprises two sections which, when the covering device is inserted, are curved substantially in the sagittal direction toward the at least one section of the vestibular clamping element, i.e. which are preferably concave indentations.

These two sections of the lip clamping element are preferably at the top or bottom, i.e. in the region of nose or chin, when the covering device is inserted. This is advantageous as the covering device does not cover nose and chin.

This means that these sections of the lip clamping element are preferably opposite the two sections of the vestibular clamping element.

Thus, the sections of the vestibular clamping element and the lip clamping element preferably approach one another. In a preferred embodiment these sections approach one another to a distance of 0 mm to 30 mm, in particular 0.5 mm to 25 mm. In a preferred embodiment the sections may also contact one another, which means that they have a distance of 0 mm, and may also be connected particularly preferably, in particular firmly connected, increasing the stability of the covering device. As a result of the elasticity of the clamping elements the covering device still remains flexible enough to be used. In spite of a connection of the clamping elements of this kind, the covering device additionally remains flexible enough to be packaged in a space-saving manner.

In a preferred embodiment the at least one section of the vestibular clamping element configures a concave indentation, wherein a film spans at least partially over the concave indentation.

In a preferred embodiment the at least one section of the lip clamping element configures a concave indentation, wherein a film or the film spans at least partially over the concave indentation.

When a film spans at least partially over the concave protrusions of the clamping elements, it is advantageous that in spite of the three-dimensionally shaped clamping elements the covering device altogether keeps the basic shape of the previous products and thus the consumer must not get used to a new shape.

In a preferred embodiment the covering device has the shape of a tube in which at least one end of the tube comprises two concave indentations.

In a further preferred embodiment the covering device has the shape of a tube with two ends in which at least the second end of the tube comprises two concave indentations.

When the clamping elements are configured as a clamping frame, in particular as a clamping ring, then the diameter of the vestibular clamping element is preferably larger than that of the lip clamping element.

"Film" preferably refers to a planar structure in the broadest sense which offers substantial no resistance to bending compared to stretching. Structures of this type may also be referred to as film-like means. Film-like means may be produced from elastically stretchable but basically also from inductile material.

In contrast to prior art, the inventive lip and cheek expanders exert extensively distributed compressive forces by means of the film-like means to the lips and cheeks which have to be kept away from the rows of teeth. One end of the film-like means is preferably connected with the vestibular clamping element positioned at least partially within the mouth cavity and the other end with the outer lip clamping element in external contact with the lips or cheeks, respectively.

Additional further film-like means may also be provided which e.g. cover the indentations in the lip and/or vestibular clamping element at least partially.

Advantageously, the film-like covering means are configured to be thin and elastic. Combined with the two clamping elements very easy, extremely flexible and widely applicable lip and cheek expanders, i.e. covering devices, may be produced. When the expander is inserted, the film-like means distribute compressive forces extensively and build them up circularly around the mouth opening. This makes it possible for the patient to keep the mouth opening open wide circularly and comfortably and simultaneously to keep the lips and cheeks gently away from the rows of teeth.

Moreover, the inventively preferred three-dimensional design also of the lip clamping element may advantageously prevent the film from covering the nose disturbingly.

A person skilled in the art knows suitable materials for the clamping elements and the film, for instance from WO 03/051185 A1 or DE 10 2014 109 023 A1, to which two documents full reference is made in this connection. Plastic is a preferred material. Preferably, the inventive covering devices may be produced by injection molding or 3D-printing.

A person skilled in the art may freely choose the thickness and shape of the material, i.e. the cross-section of the clamping elements, in particular of the vestibular clamping element. It may also be provided for the material thickness and the material shape of the clamping elements, in particular of the vestibular clamping element, to vary along the extension. By means of a variation, a person skilled in the art may influence, i.e. strengthen or weaken, the flexibility of a clamping element in certain regions.

In an alternative embodiment, the vestibular clamping element may be used for intraoral suction. In this connection, e.g. the vestibular clamping element may be configured as a hollow tube which comprises openings in the regions which are positioned intraorally through which openings oral fluid may be sucked off. The liquid may then be channeled off for instance via a web which preferably connects the vestibular clamping element with the lip clamping element, if this web is also configured in the shape of a small tube. This embodiment may advantageously reduce the need for using a sucking device or renounce the use of a sucking device, respectively In a preferable embodiment, the vestibular clamping element is connected with the lip clamping element via at least one web, in particular via one web or via two webs. Preferably, the at least one web extends in at least one concave indentation of the vestibular clamping element.

One embodiment is preferred in this connection, in which the two concave protrusions of the vestibular clamping element are connected to the lip clamping element via a web. In the preferred embodiment, two webs or even several webs are provided. However, it is also possible to use only one web.

Webs of this type may either consist of the film material or of another material suitable for this purpose.

The webs may also be realized as ribs. They can easily be configured by a rib-shaped bulge of the material of the film. They may also extend in a curved fashion to increase the tensile strength and the strength of the film particularly at those positions at which the ribs are configured.

The webs are preferably bendable but less stretchable than the film. The webs may advantageously further prevent slipping of the inner ring onto the gingiva and the associated pressure pain. The lip clamping element is preferably more stable and advantageously pulls away the lip clamping element from the gingiva by means of the non-stretchable webs. The webs may advantageously prevent the film from stretching in the medium lip region such that stretching takes place primarily in the side regions. A person skilled in the art may choose the width of the webs freely. As an alternative to the webs, grooves or straps may also be provided, and the non-stretchable or non-compressable webs may define a distance of the two rings in the front region of e.g. 18 mm to 20 mm.

According to a further aspect of the invention which is expressed in claim 17 it is provided that the vestibular clamping element comprises at least two, in particular four, protrusions pointing to the outside and protruding to the outside compared to a pointed oval, and that the shape of the vestibular clamping element is incongruent with or geometrically dissimilar to the pointed oval. Surprisingly, this solution allows for getting by with considerably fewer sizes of the covering device and thus for simplifying storage and minimizing associated costs.

In the half-open state, the mouth of a patient forms a pointed oval or an oval which is pointed at its narrow sides. The above-mentioned features make the vestibular clamping element differ in shape from the mouth of a patient in such a way that very different mouth sizes may be covered with one covering device.

This does not only considerably reduce storage costs but also production costs as it is only necessary to produce one injection-molding tool, not 3 or 4.

According to the invention, protrusions of the vestibular clamping element radially to the outside are provided compared to the circular form. The protrusions themselves each have a round outer form with a radius which is smaller than the radius of a standard vestibular ring, e.g. between 0.1 cm and 5 cm, preferably 2 to 3 cm. This radius may also be selected in any other desired way, e.g. between 0.3 cm and 4 cm, but also between 0.8 cm and 2.5 cm.

The vestibular clamping element provided in this inventive form is thus similar to a rectangular shape and preferably appears like a rectangle with rounded corners.

The layout of the line which is contrary to the oval shape of the mouth is thus an inventive special feature. The diverging regions, particularly the protrusion corners, serve to support the vestibular clamping element within the mouth of the patient. The critical regions in the sagittal plane, i.e. the region of the labial frenula, and in the horizontal plane are avoided consciously, no support pressure is exerted thereat consciously.

The inventive "support regions" of the vestibular clamping element at the protrusion corners, i.e. left/top, left/bottom, right/top and right/bottom, are in contact with the interior of the mouth and provide support even if the size of the clamping element is rather large or rather small for the mouth of the patient.

When the clamping element is rather large for the patient, the protrusion corner moves toward the distal direction along the interior of the cheek. When the clamping element is rather small, the protrusion corners still provide support due to the different shapes or incongruity compared to the oval or pointed oval of a mouth opening.

In this way, several Optragate sizes may be covered.

It is preferred to shape the vestibular clamping element such that it is in contact at 4 points, i.e. top right, bottom right, bottom left and top left, to prevent slipping out. However, it is also possible to vary the number of these points and to provide e.g. 2, 3, 5 or 6 points.

Contact outside of the regions or points described herein may also be considered.

The associated lip clamping element may also be shaped in the same manner, i.e. congruent with the vestibular clamping element, or also ovally or circularly.

A particular advantage of this embodiment with the protrusion corners is also that the spreading effect acts particularly laterally to the outside. Thus, the vestibular regions at the molars which are important for scanning processes are made particularly easily accessible.

Then, a scan head may be introduced from the side particularly easily to scan the vestibular region of the molars as generous space is left empty thereat.

Preferably, the protrusions should be round, the ideal radius or possibly curve extension may be adapted to the requirements largely.

This solution has in inner interdependency with the solution with the anteriorly curved section according to claim 1: Retention is lost at the indentation thereat by the curved section. According to the invention this is compensated for advantageously by the protrusions at other places, the "wings" or "ears", i.e. the protrusion corners.

According to an advantageous embodiment of this solution the vestibular clamping element is curved slightly around a vertical axis which is posterior to this clamping element. In case of smaller mouth openings, protrusion corners move to the softer cheek region in the distal direction. But still the protrusion corners are supported even with larger mouth openings.

The present invention also relates to a covering device for covering the lips and labial angles and for holding the lips, cheeks and labial angles away from the rows of teeth in the mouth of a patient which comprises an elastic lip clamping element for external contact with the mouth opening, at least one elastic vestibular clamping element for inserting into the oral vestibule of the mouth of the patient and a film connecting the clamping elements, wherein the clamping elements are arranged along two opposite end regions of the film such that the inserted covering device is open towards the mouth cavity, wherein:

the film offers substantially no resistance to bending compared to stretching, and at least one intraoral section of the vestibular clamping element is suitable to be inserted into a region of the oral vestibule of the patient in the elastically deformed state and to fix the film intraorally, so that when the covering device is inserted the film extends between the extraoral lip clamping element and the vestibular clamping element in contact with the lips and labial angles and therearound and is suited to exert substantially evenly distributed planar compressive forces to the lips and labial angles which push away the lips, cheeks and labial angles from the teeth and the alveolar bone and pretension the mouth opening circularly into an opened position, wherein the covering device allows for closing the mouth, and wherein the vestibular clamping element is connected with the lip clamping element via at least one web, in particular via one web or via two webs.

According to a first preferred embodiment of the invention it is provided that the lip clamping element and/or the film exert a force onto the vestibular clamping element which reduces contact pressure of the vestibular clamping element on the mucosa covering the alveolar bone.

According to a second preferred embodiment of the invention it is provided that, when the covering device is inserted, the vestibular clamping element is in at least partial planar contact with the mucosa covering the alveolar bone.

According to a third preferred embodiment of the invention it is provided that the lip clamping element comprises a greater material thickness than the vestibular clamping element.

According to a fourth preferred embodiment of the invention it is provided that the film comprises at least one rib-shaped ridge, in particular a fluting, extending between the lip clamping element and the vestibular clamping element.

According to a fifth preferred embodiment of the invention it is provided that the film in the region of the lip clamping element comprises a greater material thickness than in the region of the vestibular clamping element.

According to a sixth preferred embodiment of the invention it is provided that the lip clamping element is less elastic than the vestibular clamping element.

According to a seventh preferred embodiment of the invention it is provided that in the non-stretched state the film has a length of 2 cm at most between the lip clamping element and the vestibular clamping element.

According to an eighth preferred embodiment of the invention it is provided that the film at the vestibular clamping element is attached to that region or area of the vestibular clamping element which points in the direction of the lip clamping element, or is attached to that area of the vestibular clamping element which has the largest diameter, or in between.

According to a ninth preferred embodiment of the invention it is provided that, after production, the vestibular clamping element does not comprise any sprue at the area which is in contact with the mucosa covering the alveolar bone after insertion of the vestibular clamping element into the oral vestibule of the mouth of the patient.

Preferred embodiments also emerge from the subclaims.

BRIEF DESCRIPTION OF THE DRAWING

The present invention is explained in greater detail on the basis of the following Figures and examples which are not to be considered as limiting.

FIG. 2 shows the side view of the covering device from FIG. 1a;

FIG. 3 shows the two clamping elements of the covering device from FIG. 1a;

DETAILED DESCRIPTION

Figure 1A:
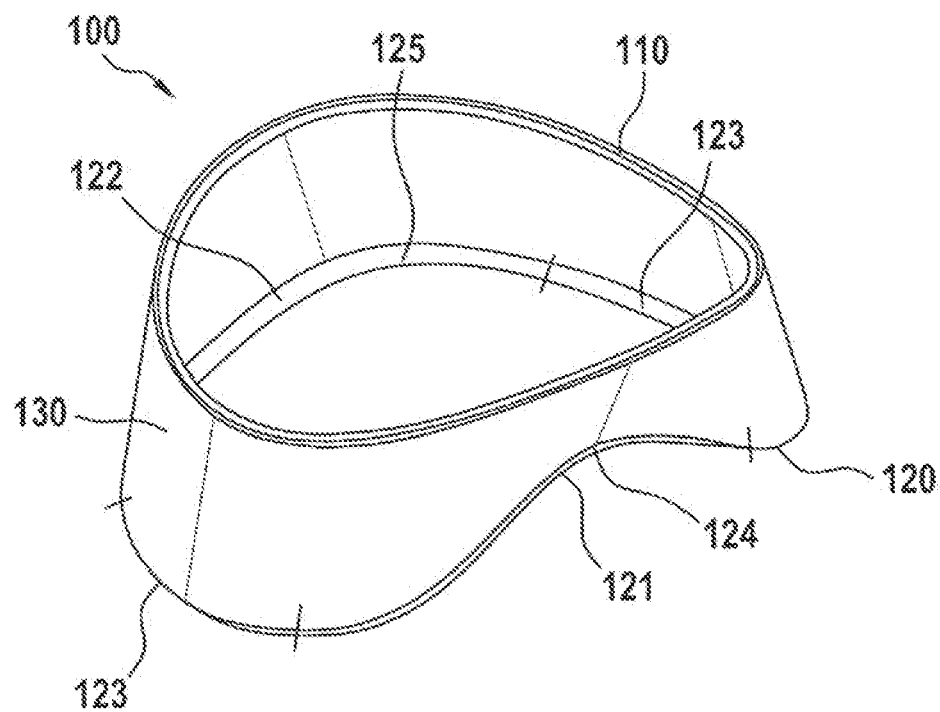
FIG. 1a shows an inventive covering device in one embodiment.

FIG. 1 shows an inventive covering device. FIG. 1a shows the covering device (100) consisting of a lip clamping element (110)—configured as a clamping ring—, a vestibular clamping element (120) and a film (130). While the lip clamping element (110) is at least almost planar with regard to plastic shaping, even if it consists of a flexible material and is thus flexible, the vestibular clamping element (120) comprises a three-dimensional basic shape with two sections (121, 122) which point towards the lip clamping element (110) and thus cause the covering device to taper in this region or rather form concave indentations (124, 125), respectively. The curved sections (121, 221, 321) may occupy between 10 percent and 60 percent of the circumference of the vestibular clamping element (120, 220, 320) but also between 20 and 50 percent. A preferred value may be approximately 40 percent. The circumference may amount to e.g. 30 cm, and the added length of both indentations 124, 125 may be 14 cm, i.e. between 40 and 50 percent. The curved sections (121, 221, 321) are substantially sinusoidal-shaped or double S-shaped. Moreover, the curved section (121, 221, 321) shortens the film (130, 230, 330) in the center of the curved section (121, 221, 321) to 30 to 70 percent, compared to the remaining regions.

Now, if the covering device (100) is used, the vestibular clamping element (120) is inserted into the mouth such that the two regions or clamping sections (123) of the clamping element (120) are inserted in the oral vestibule in the region of the molars and contact the cheek. However, as a result of the design showed, the further regions (121, 122) are not in the oral vestibule but extend in the sagittal direction anterior to the oral vestibule. In this connection, depending on the design, the extension of the anteriorly curved sections (121 and 122) may be provided intraorally along the lip or extraorally. Due to this extension outside of the oral vestibule, in the front region, i.e. in the region of the canine teeth and incisors, pressure on the mucous membrane in contact with the jaw bone and supported by it and thus respective pressure sores are prevented.

Figure 1B:
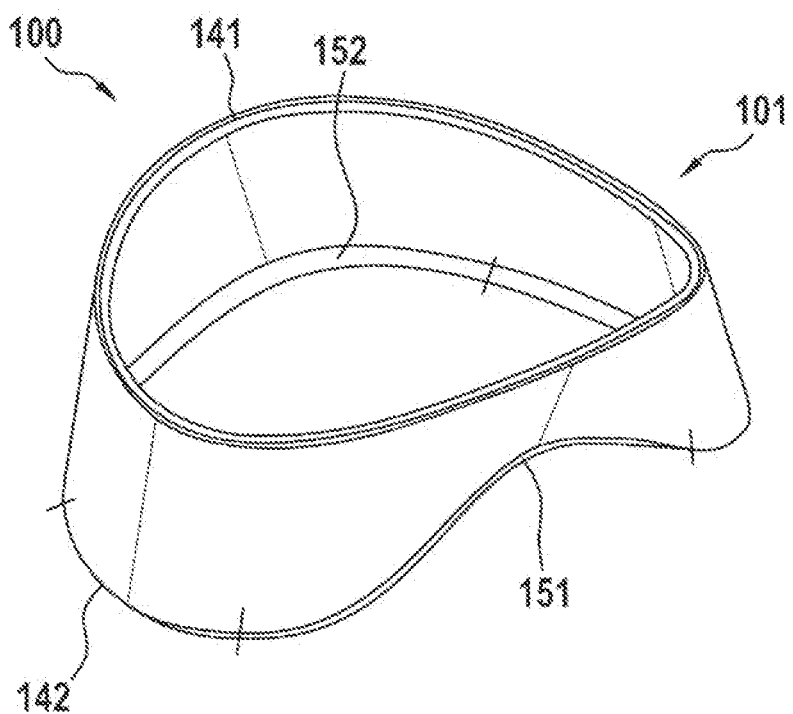
FIG. 1b shows an inventive covering device in one embodiment

FIG. 1b shows the same covering device (100) wherein attention is paid to the basic design in the shape of a tube (101) with two ends (141, 142), wherein the ends are configured by said clamping elements and wherein the second end (142) of the tube (101) comprises two concave indentations (151, 152).

Figure 2:
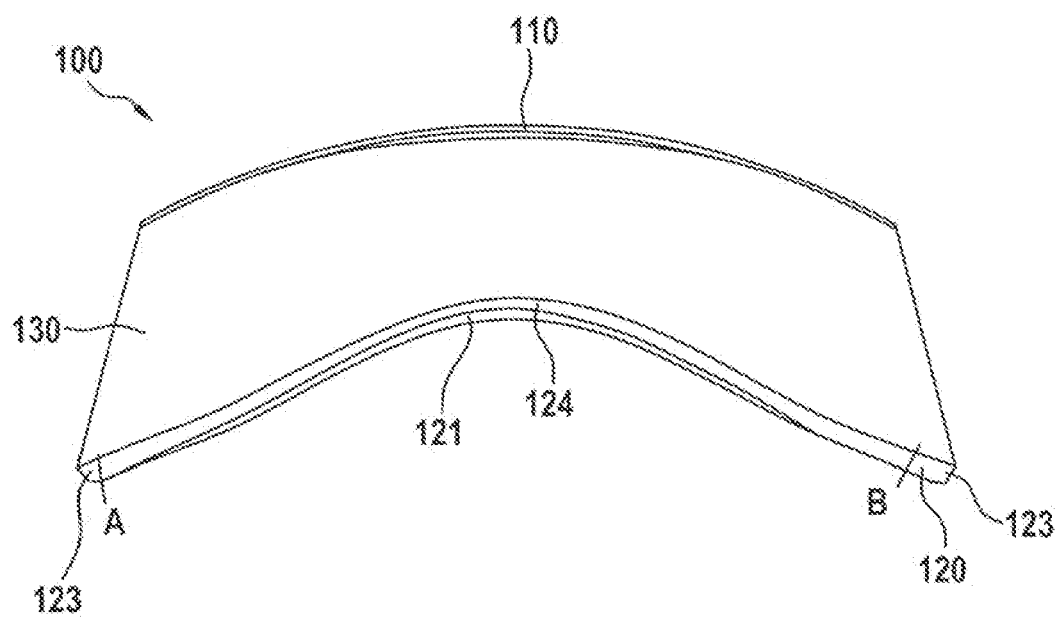

FIG. 2 shows the covering device (100) from FIG. 1a in the side view. Again, the two clamping elements (110, 120) with the intermediate film (130) are apparent. In addition to the two intraoral clamping sections (123), the vestibular clamping element comprises a section (121) which extends between the points A and B and which forms a concave indentation (124) and thus presents a section curved in the anterior direction which extends in the sagittal direction anterior to the vestibular fold when the covering device is inserted.

Figure 3:
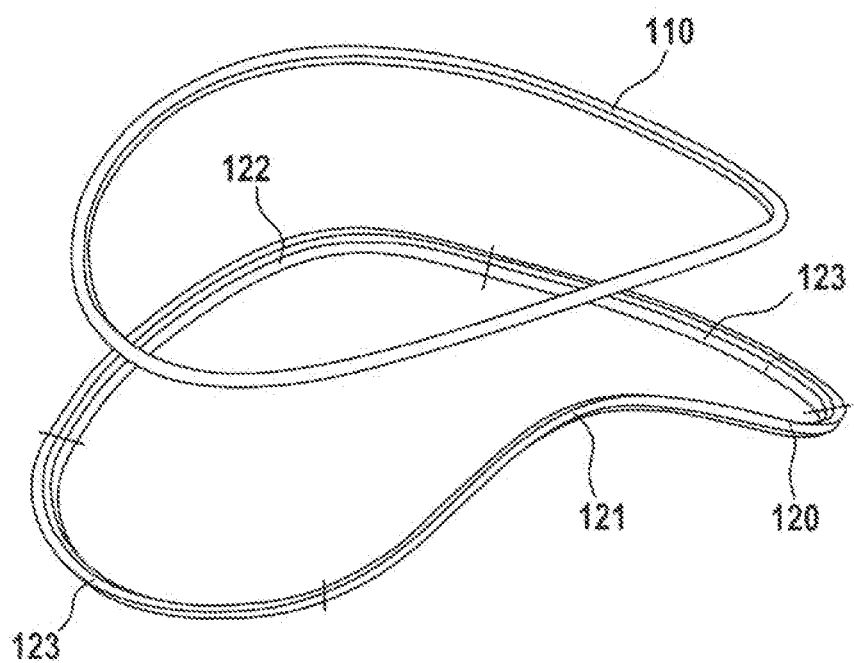

FIG. 3 shows the two clamping elements (110, 120) of the covering device from FIGS. 1a and 2. The vestibular clamping element (120) is divided in four sections, two intraoral clamping sections (123) and two anteriorly curved sections (121, 122).

In this connection, "anterior" refers to the extension extending in the direction of the lip clamping element (110) as it is completely outside of the mouth and thus anterior to the vestibular clamping element (120) when the covering device is in the inserted state.

The most anterior point of the sections (121, 122) of the vestibular clamping element (120) has a distance of approximately 20 mm to the lip clamping element (110) when the film is planar but not stretched and not clamped.

Figure 4:
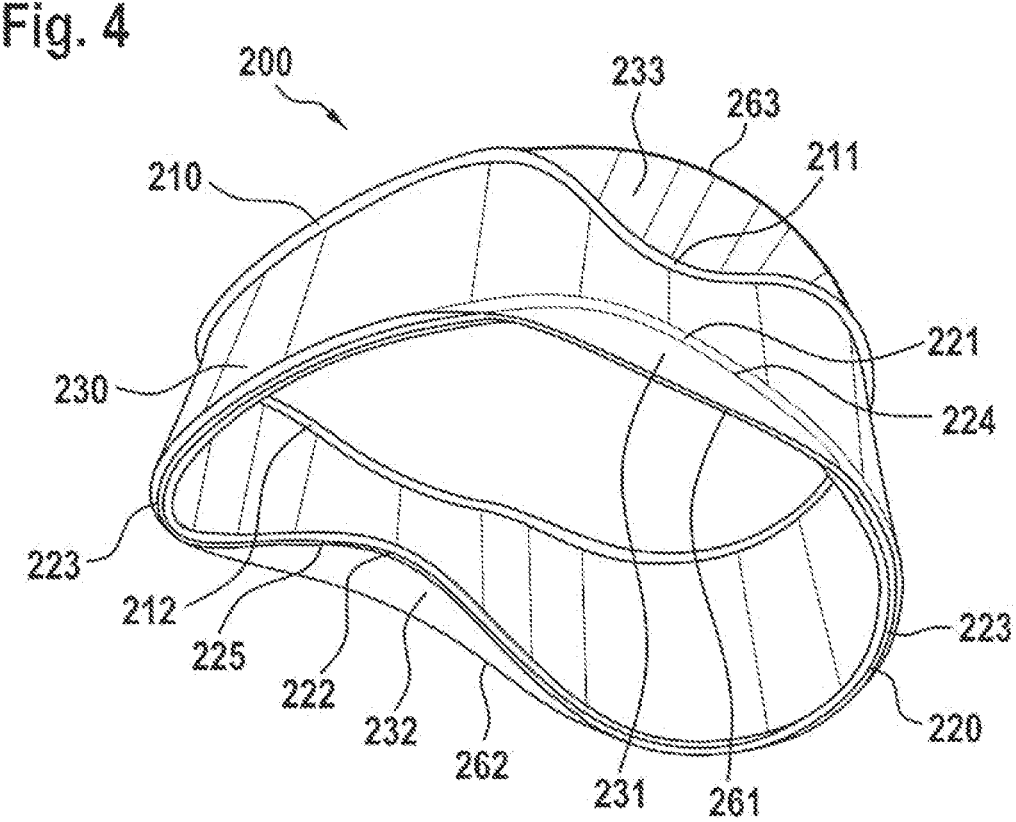
FIG. 4 shows an alternative inventive covering device.

FIG. 4 shows an alternative embodiment of the inventive covering device (200) which again comprises a lip clamping element (210), a vestibular clamping element (220) and a film (230). Again, the vestibular clamping element (220) comprises a three-dimensional basic shape with two sections (221, 222) which point towards the lip clamping element (210) and thus cause the covering device to taper in this region or rather form concave indentations (224, 225) thereat, respectively.

Now, if the covering device (200) is used, the vestibular clamping element (220) is inserted into the mouth such that the two regions or clamping sections (223) of the clamping element (220) are inserted in the oral vestibule in the region of the molars and contact the cheek. However, as a result of the design showed, the further regions (221, 222) are not in the oral vestibule but extend in the sagittal direction anterior to the oral vestibule. In this connection, depending on the design, the extension of the anteriorly curved sections (221 and 222) may be provided intraorally along the lip or extraorally.

Additionally, the lip clamping element (210) comprises a three-dimensional basic shape with two sections (211, 212) which point towards the vestibular clamping element (220) and thus cause the covering device to taper in this region. Thus, nostrils and chin are advantageously not covered by the film (230). However, to achieve the known basic shape and to provide an improved cover, the concave recesses of both clamping elements (210, 220) are provided with additional covers (231, 232, 233) which are held by additional thin struts (261, 262, 263). The struts (261, 262, 263) hold the additional covers (231, 232, 233) in a position which does not disturb the patient in the region of the nose nor in the region of the chin and which also covers the lip.

Figure 5:
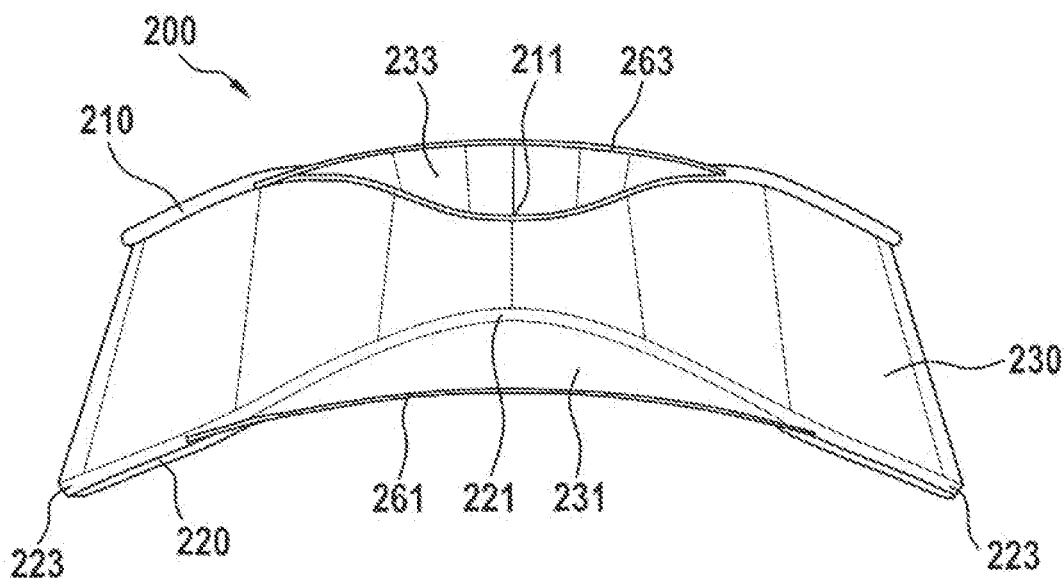
FIG. 5 shows the side view of the covering device from FIG. 4.

FIG. 5 shows the covering device (200) from FIG. 4 in the side view. Again, the two clamping elements (210, 220) with the intermediate film (230) are apparent. In addition to the two intraoral clamping sections (223), the vestibular clamping element (220) comprises a section (221) which forms a concave indentation and thus presents a section curved in the anterior direction which extends in the sagittal direction anterior to the vestibular fold when the covering device is inserted. The lip clamping element (210) also has an indentation (211) which points in the direction of the indentation (221) of the vestibular clamping element (220).

Again, two additional covers (231, 233) with the respective holding struts (261, 263) are apparent.

Figure 6:
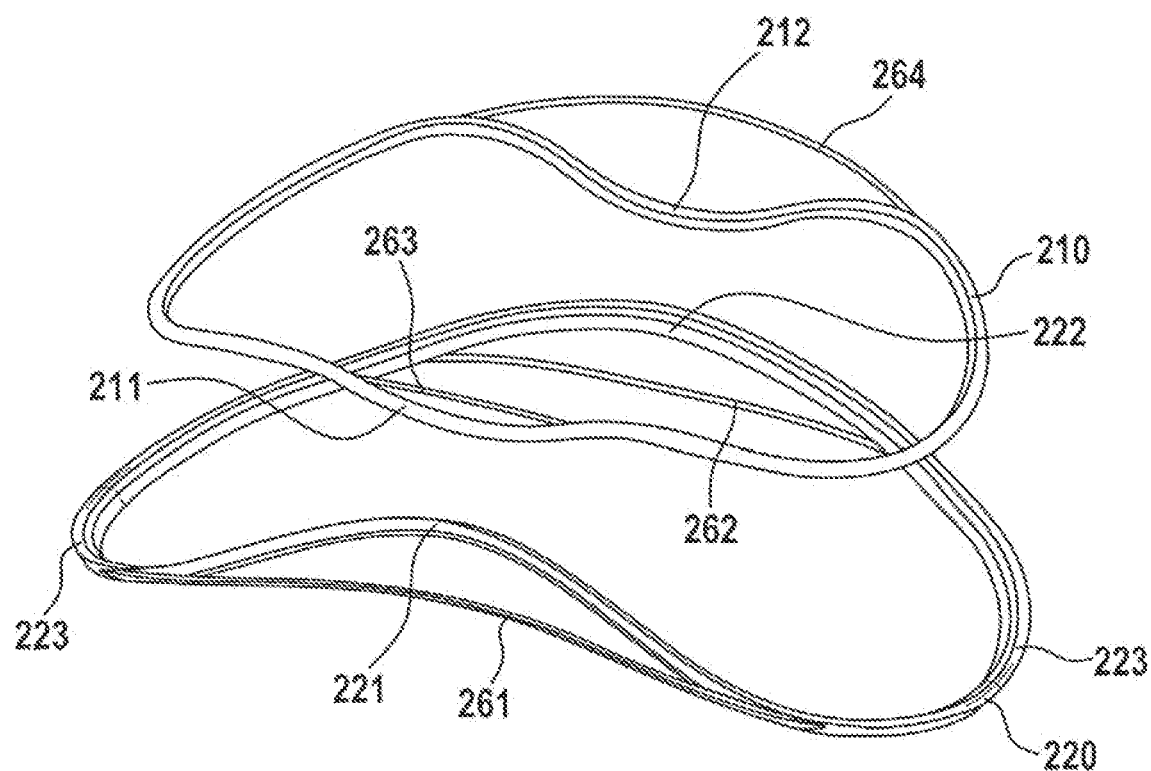
FIG. 6 shows the two clamping elements of the covering device from FIG. 4.

FIG. 6 shows the two clamping elements (210, 220) of the covering device from FIGS. 4 and 5. The vestibular clamping element (220) comprises two intraoral clamping sections (223) and two anteriorly curved sections (221, 222) which are provided with holding struts (261, 262). The lip clamping element (210) also comprises two sections (211, 212) curved toward the vestibular clamping element (220) which are provided with holding struts (263, 264).

The most anterior point of the sections (221, 222) of the vestibular clamping element (220) has a distance of approximately 12 mm to the lip clamping element (210) when the film is planar but not clamped.

Figure 7:
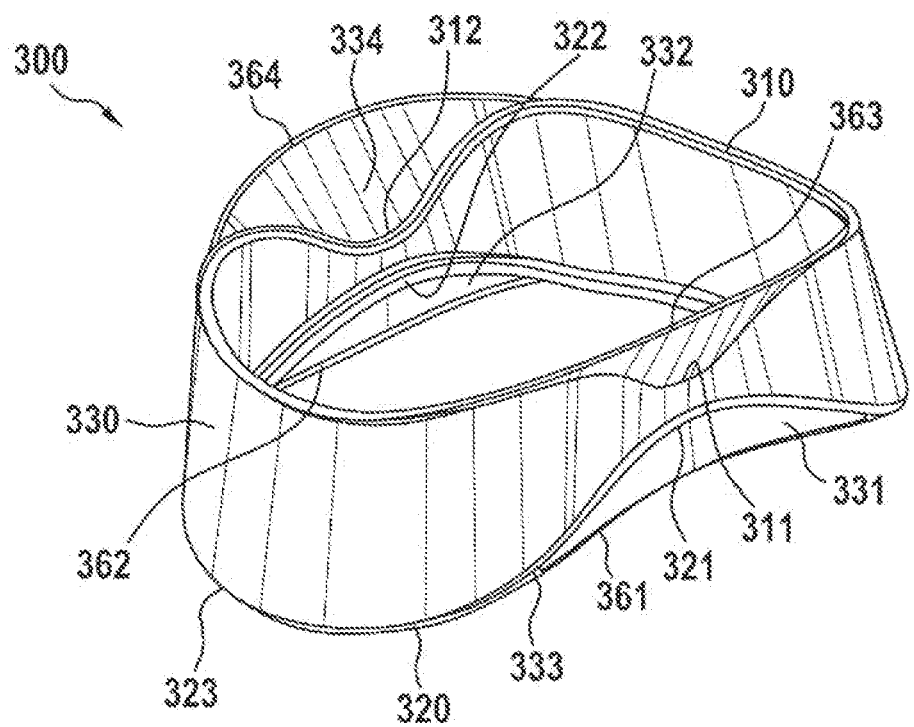
FIG. 7 shows a further alternative inventive covering device.

FIG. 7 shows a further alternative embodiment of the inventive covering device (300) which again comprises a lip clamping element (310), a vestibular clamping element (320) and a film (330). Again, the vestibular clamping element (320) comprises a three-dimensional basic shape with two sections (321, 322) which point towards the lip clamping element (310) and thus cause the covering device to taper in this region.

Now, if the covering device (300) is used, the vestibular clamping element (320) is inserted into the mouth such that the two regions or clamping sections (323) of the clamping element (320) are inserted in the oral vestibule in the region of the molars and contact the cheek. However, as a result of the design showed, the further regions (321, 322) are not in the oral vestibule but extend in the sagittal direction anterior to the oral vestibule. In this connection, depending on the design, the extension of the anteriorly curved sections (321 and 322) may be provided intraorally along the lip or extraorally, wherein in the present case an embodiment for an extraoral extension is shown.

Additionally, the lip clamping element (310) comprises a three-dimensional basic shape with two sections (311, 312) which point towards the vestibular clamping element (320) and thus cause the covering device to taper in this region. Thus, nostrils and chin are advantageously not covered by the film (330). However, to achieve the known basic shape and to provide a further cover, the concave recesses of both clamping elements (310, 320) are provided with additional covers (331, 332, 333, 334) which are held by additional thin struts (361, 362, 363, 364).

Figure 8:
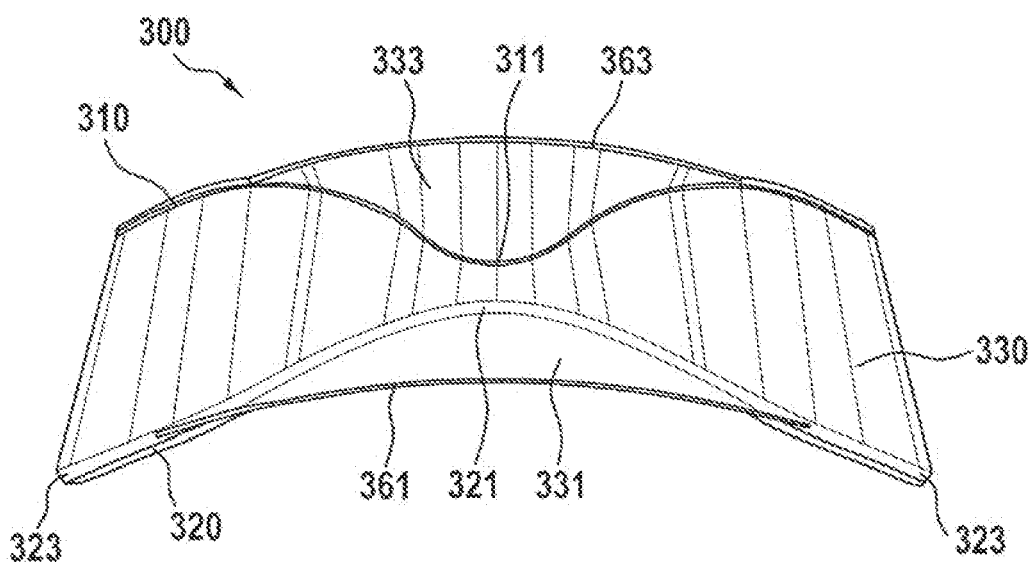
FIG. 8 shows the side view of the covering device from FIG. 7.

FIG. 8 shows the covering device (300) from FIG. 7 in the side view. Again, the two clamping elements (310, 320) with the intermediate film (330) are apparent. In addition to the two intraoral clamping sections (323), the vestibular clamping element (320) comprises a section (321) which forms a concave indentation and thus presents a section curved in the anterior direction which extends in the sagittal direction anterior to the vestibular fold when the covering device is inserted. The lip clamping element (310) also has an indentation (311) which points in the direction of the indentation (321) of the vestibular clamping element (320).

Again, two additional covers (331, 333) with the respective holding struts (361, 363) are apparent.

Figure 9:
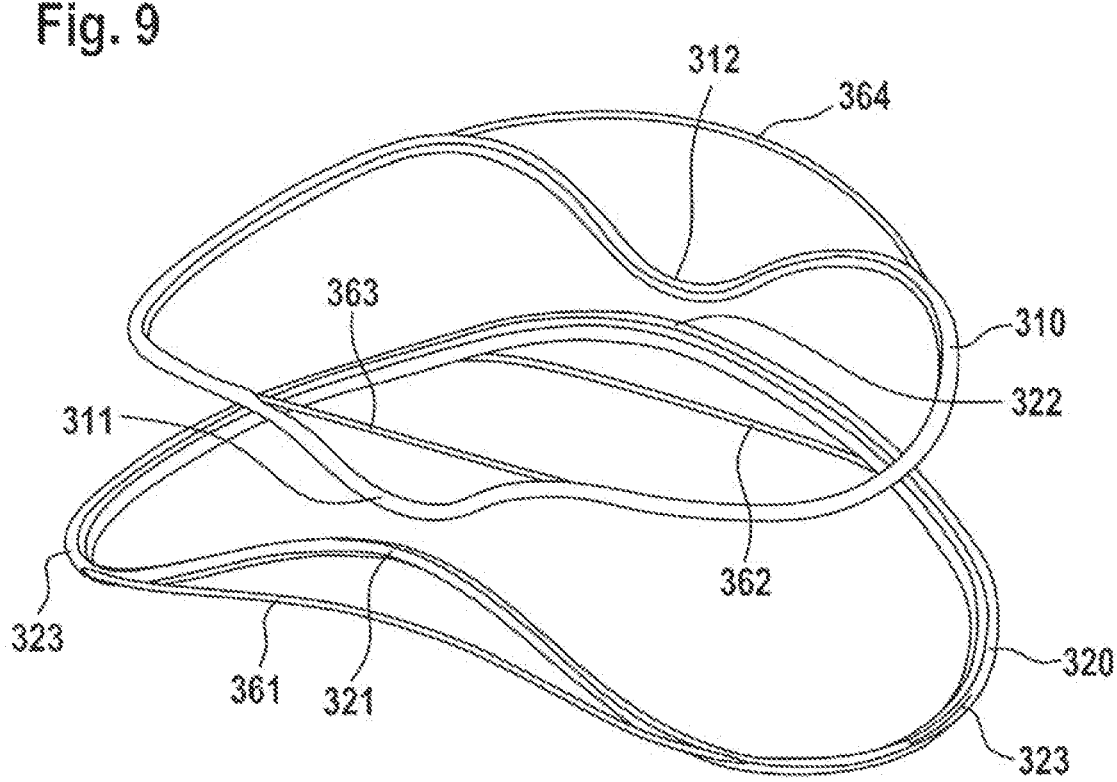
FIG. 9 shows the two clamping elements of the covering device from FIG. 7.

FIG. 9 shows the two clamping elements (310, 320) of the covering device from FIGS. 7 and 8. The vestibular clamping element (320) comprises two intraoral clamping sections (323) and two anteriorly curved sections (321, 322) which are provided with holding struts (361, 362). The lip clamping element (310) also comprises two sections (311, 312) curved toward the vestibular clamping element (320) which are provided with holding struts (363, 364).

The most anterior point of the sections (321, 322) of the vestibular clamping element (320) has a distance of approximately 4 mm to the lip clamping element (310) when the film is planar but not clamped.

Figure 10:
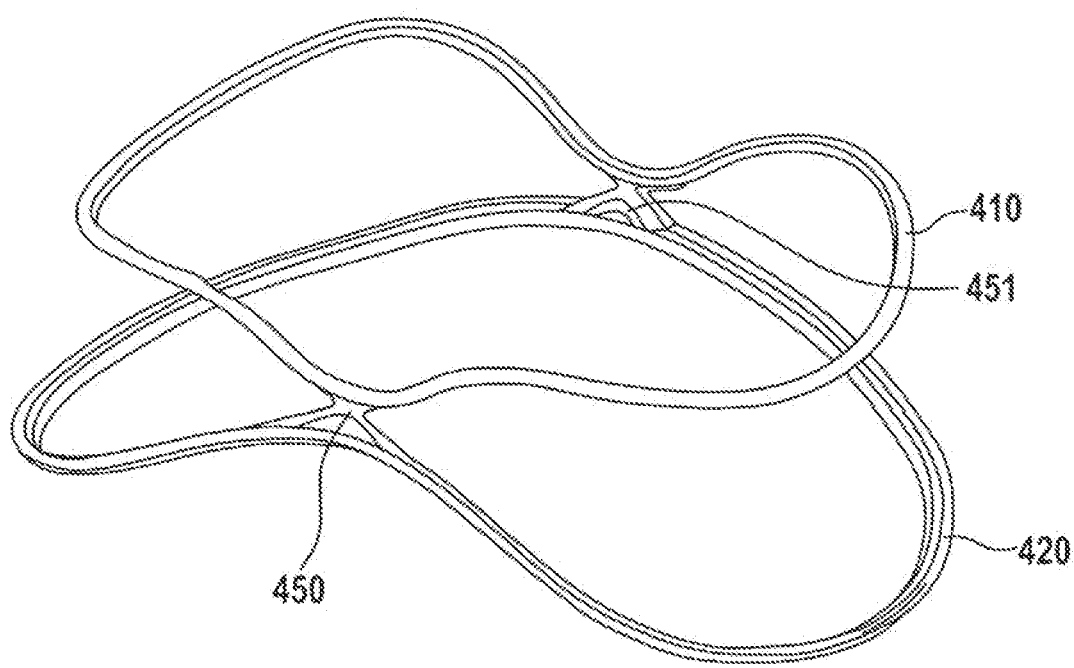
FIG. 10 shows the two clamping elements in a further embodiment.

FIG. 10 shows the two clamping elements (410, 420) in a further embodiment in which the two clamping elements (410, 420) are connected to one another at the concave indentations, respectively, and in which the two connections sites (450, 451) are configured similar to an intersection. In this embodiment, the two clamping elements (410, 420) may be produced in one piece advantageously.

Figure 11:
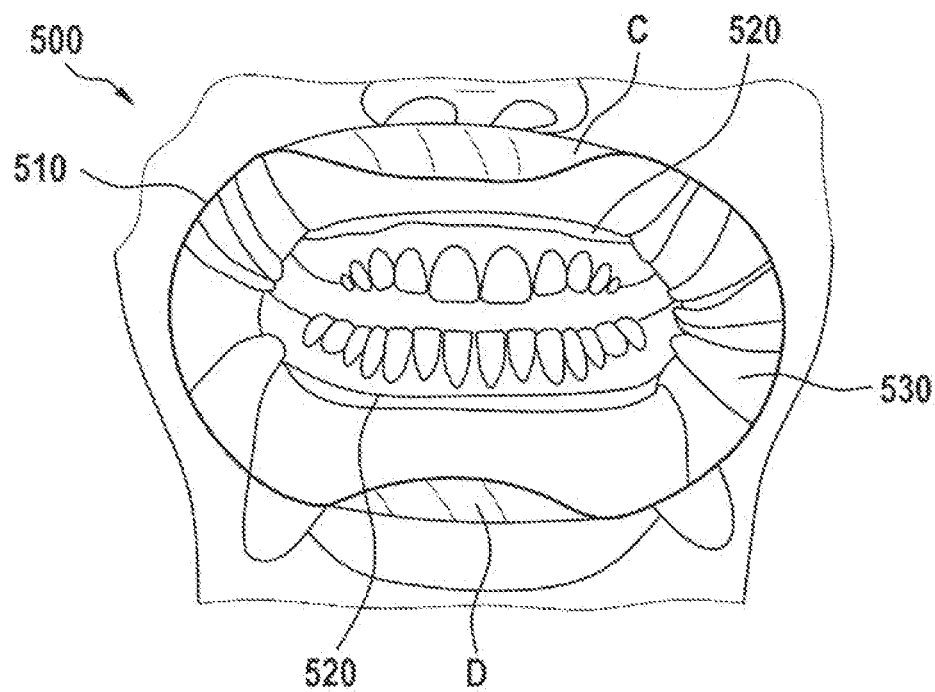
FIG. 11 shows a comparison of the inventive covering device with a prior art covering device during use.

FIG. 11 shows the comparison of the inventive covering device (500) with a prior art covering device during use. The covering device (500) consists of a lip clamping element (510), a vestibular clamping element (520) and a film (530). In case of prior art covering devices both clamping elements are ring-shaped, substantially circular-ring-shaped. As a result, the inner clamping ring is positioned completely in the oral vestibule and may cause pressure marks thereat. The outer clamping ring extends to the nose and chin.

In the illustrated inventive embodiment both the outer lip clamping element (510) and the vestibular clamping element (520) are shaped such that they converge in the upper and lower regions.

This provides two advantages: On the one hand, in the front region the vestibular clamping element (520) does not rest on the mucous membrane covering the jaw bone but extends in the anterior direction across the lip to the outside. On the other hand, as a result of the indentations of the lip clamping element (510) contrary to prior art covering devices the regions below the nose and at the chin (C, D) are not covered by the film (530) such that simple breathing through the nose is possible and the lip clamping element (510) does not press on the chin if the latter is configured to be larger.

Figure 12:
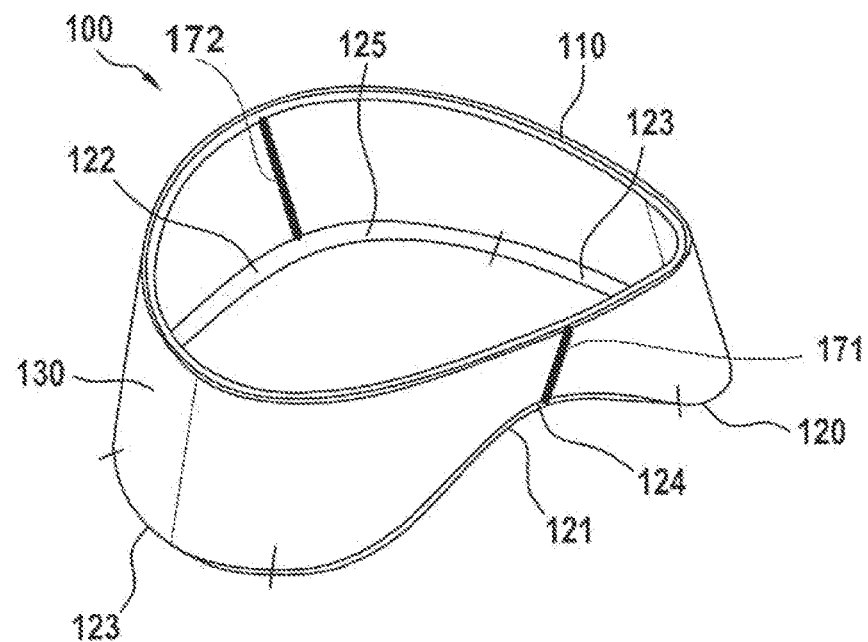
FIG. 12 shows the inventive covering device from FIG. 1a with webs.

FIG. 12 shows an inventive covering device (100) as is shown in FIG. 1a. Again, the lip clamping element (110), the vestibular clamping element (120) and the film (130) are apparent. The vestibular clamping element (120) comprises four sections (121, 122, 123), wherein the sections (121, 122) form concave indentations (124, 125), respectively. In the region of these concave indentations (124, 125) the vestibular clamping element (120) is connected to the lip clamping element (110) via webs or straps.

Compared to the film (130) the webs (171, 172) are not stretchable such that the webs (171, 172) define a fixed distance between the vestibular clamping element (120) and the lip clamping element (110) in the region of the concave indentations (124, 125). By means of the webs (171, 172), the lip clamping element (110) may pull away the vestibular clamping element (120) from the gingiva when the covering device (100) is used.

Figure 13:
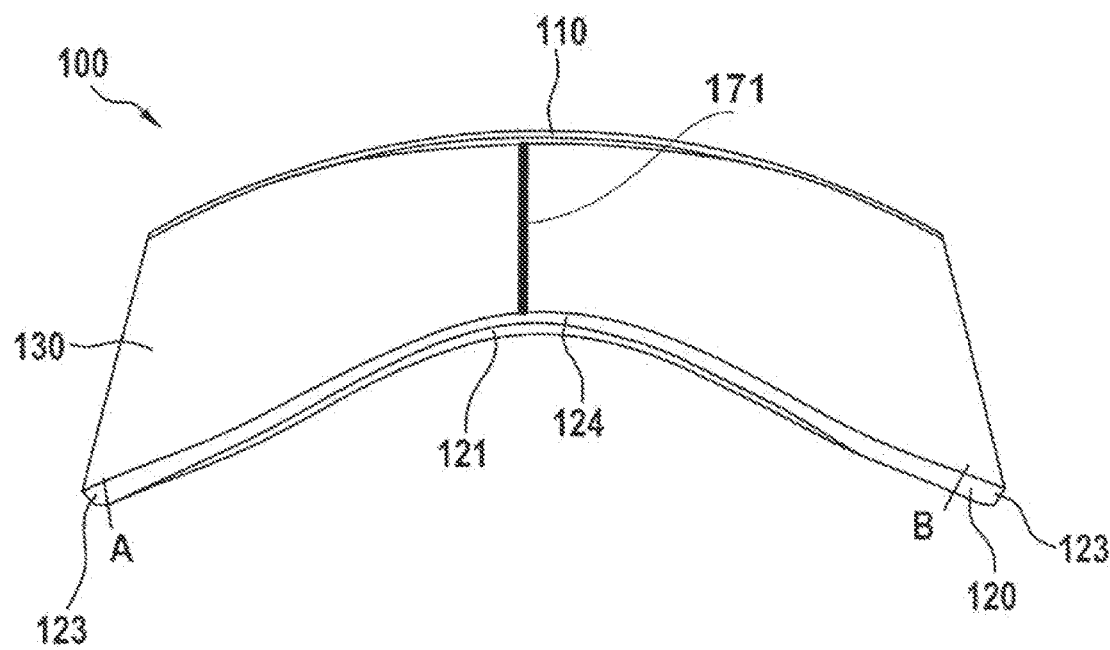
FIG. 13 shows the side view of the covering device from FIG. 12.

FIG. 13 shows the covering device (100) from FIG. 12 in the side view. Again, the two clamping elements (110, 120) with an intermediate film (130) are apparent. In addition to the two intraoral clamping sections (123), the vestibular clamping element comprises a section (121) which extends between the points A and B and which forms a concave indentation (124) and thus presents a section curved in the anterior direction which extends in the sagittal direction anterior to the vestibular fold when the covering device is inserted. In this region the vestibular clamping element (120) is connected to the lip clamping element (110) via a web (171).

Figure 14:
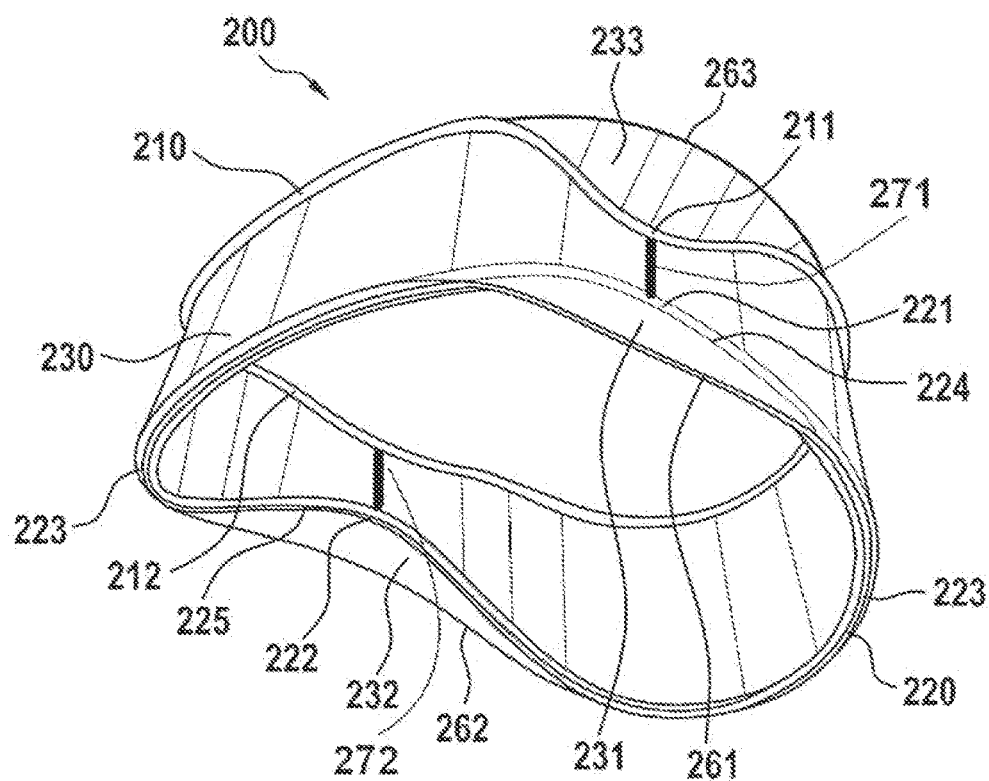
FIG. 14 shows the inventive covering device from FIG. 4 with webs.

FIG. 14 shows the alternative embodiment of the inventive covering device (200) from FIG. 4. Reference is made to the description of FIG. 4 for the basic design. Additionally, the covering device (200) comprises two webs (271, 272) which connect the two clamping elements (210, 220) in the region of the concave indentations (224, 225).

Figure 15:
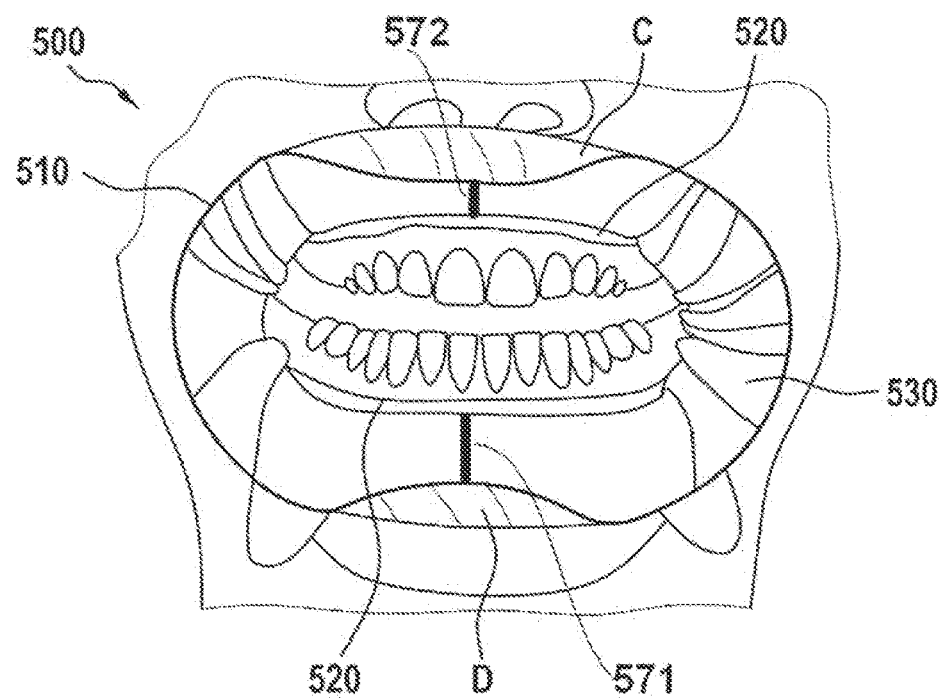
FIG. 15 shows an inventive covering device with webs during use.

FIG. 15, just like FIG. 11, shows a comparison of the inventive covering device (500) with a prior art covering device during use. The covering device (500) consists of a clamping element (510), a vestibular clamping element (520) and a film (530). The two clamping elements (510, 520) are connected to one another via webs (571, 572), namely in the medium region of the lips, i.e. the concave indentations of the clamping elements (510, 520). By means of the webs (571, 572) the outer clamping element (510) pulls away the inner clamping element (520) from the gingiva such that pressure marks are avoided even more easily. Like in FIG. 11, the regions under the nose and at the chin (C, D) are not covered by the film (530).

Figure 16:
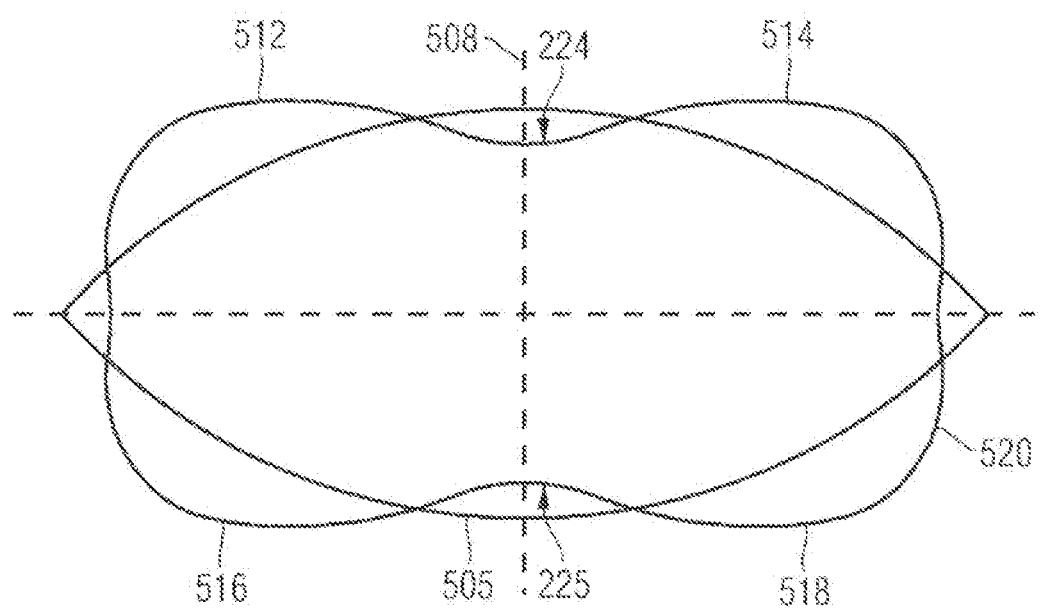
FIG. 16 shows a further inventive covering device in a schematic view, in the configuration according to claim 17.

One configuration of the invention as claimed in claim 17 is apparent schematically from FIG. 16. A mouth opening 505 is illustrated schematically as a pointed oval. This shape corresponds to a mouth which is open up to one third to one half. A mouth which is open even wider may rather be described as an oval. Then, this shape rather corresponds to the shape illustrated in FIG. 11.

It is to be understood that the illustration and the description of shape are schematized strongly herein. In practice, no or almost no natural shape corresponds to an exact geometrical shape.

An inventive vestibular clamping element 520 is illustrated in FIG. 16 and lies over the mouth opening 505. The vestibular clamping element is in the relaxed state in this shape.

In the center, i.e. in the sagittal plane 508 and slightly to the right and left thereof, indentations 224 and 225 are provided. They extend toward one another. In a modified configuration they extend in the anterior direction, i.e. toward the lip clamping element which is not illustrated herein.

Further laterally to the indentation 224 protrusions 512 and 514 are configured, and further laterally to the indentation 225 protrusions 516 and 518. As is apparent from FIG. 16, the clamping element 520 forms approximately a rectangle with rounded corners, wherein in particular the radius of the corners—i.e. the protrusions 512 to 518—is between 1 cm and 7 cm, in particular 2 to 4 cm.

The clamping element 520 according to FIG. 16 is not oval and even less circular ring-shaped. Rather, the protrusions 512 to 518 extend into regions outside of the mouth oval 505, and the clamping element 520 is incongruent with or geometrically dissimilar to the mouth oval.

As this is about the vestibular clamping element 520, it contacts the interior of the lips and cheek with its protrusions 512 to 518 in the inserted state, namely at that places at which protrusions 512 to 518 are configured.

Here, a comparatively large mouth opening 505 is illustrated. Of course, its size is patient-specific. As is apparent, there is also substantial overlapping between the inside of the mouth and the clamping element 520, namely at the protrusions 512 to 518.

If the same covering device is inserted into a smaller mouth opening 505, the protrusions 512 to 518 are even larger relatively.

But still the covering device has substantial wearing comfort in this embodiment as the lateral regions of the clamping element 520 with the protrusions 512 to 518 slide along the insides of the cheeks obliquely towards the outside and to the rear simultaneously, i.e. to distal or posterior.

It is also possible to comfortably insert the covering device into a smaller mouth opening. Appropriately, the lateral region is inserted centrally first and then moved laterally. Preferably to a point where the other lateral region is close to the center and may also be inserted. Only then centering is carried out, which, however, takes place basically automatically due to the effect of the elastic film 530.

The lip clamping element 510 may have any desired shape in the embodiment according to FIG. 16. For this purpose, reference is made to the illustration according to FIGS. 1a to 15. However, it may also have the same shape as the vestibular clamping element 520, or be congruent therewith, or deviate slightly in shape by e.g. 10% in contrast thereto.

It is also possible to realize a shape of the vestibular clamping element 520 only according to claim 17 but without the features according to claim 1. This embodiment does without the indentations 224 and 225 according to FIG. 16. A straight or substantially straight horizontal section of the vestibular clamping element 520 extends between the upper protrusions 512 and 514 on the one hand, and the lower protrusions 516 and 518 on the other hand.

Hybrid kinds are also possible, i.e. kinds in which a straight section is combined with one of the indentations 224 or 225.

Figure 17:
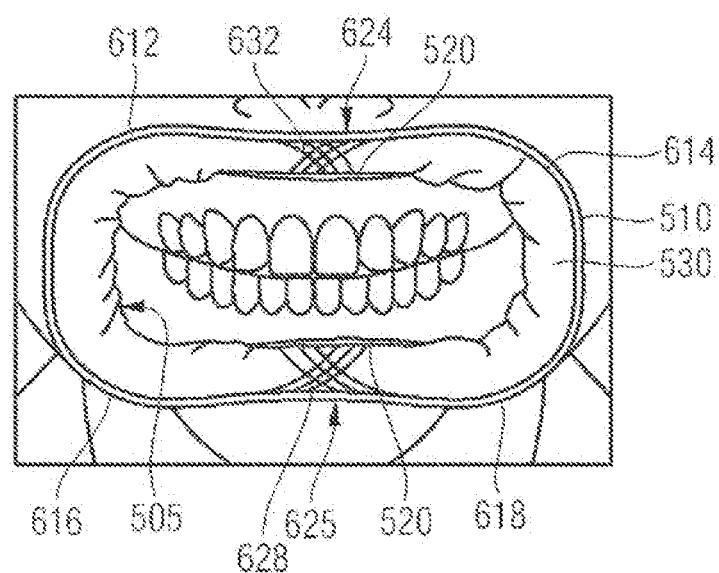
FIG. 17 shows the embodiment according to FIG. 16 in its practical use.

In FIG. 17 a further embodiment of the inventive covering device is illustrated. In this embodiment, the illustrated lip clamping element 510 is congruent with or geometrically similar to the vestibular clamping element 520 of which only a small part can be seen.

As a result of the tension by the film 530 acting radially to the outside the mouth opening 505 is deformed. In the relaxed state—which is to be taken as a basis for the features of claim 17—it comprises an oval shape.

In the embodiment according to FIG. 17 the vestibular clamping element 520 is also incongruent with and additionally geometrically dissimilar to the oval or pointed oval shape of the mouth opening 505.

According to the invention, protrusions 512, 514, 516 and 518 extend in correspondence with the apparent protrusions 612, 614, 616 and 618 radially toward the outside and convexly and extend along the insides of the cheeks of the patient in the lateral direction.

The protrusions 512, 514, 516 and 518 extend as protrusion corners diverging from one another in 4 directions in space, in the exemplary case to the left/top, right/top, left/bottom and right/bottom. They extend at a slanted angle, both to the horizontal and the vertical plane, to regions along the insides of the cheeks which are particularly flexible free of pain.

As a result of the preferably provided indentations 524 and 525 (FIG. 16) of the vestibular clamping element, corresponding to the indentations 624 and 625 of the lip clamping element, the labial frenula and the oral vestibule are additionally relieved from pressure and protected such that the altogether wearing comfort of the inventive covering device compared to the state of the art is improved considerably.

In the embodiment according to FIG. 17, in the region of the indentation 624 a plurality of ribs or webs 632 is configured. They may extend parallel to one another in or at the film 530 and may start from the lip clamping element 510. But they may also diverge from one another in the direction of the vestibular clamping element or converge to one another. They may consist of film material or of another material. They may be curved and intersect one another, but they may also extend without crossing one another. They may also extend in a straight line.

A corresponding plurality of ribs or webs 628 is configured at the indentation 625. The same possible configurations apply to them correspondingly.

The invention claimed is:

1. A covering device for covering the lips and labial angles and for holding the lips, cheeks and labial angles away from rows of teeth in the mouth of a patient, comprising an elastic lip clamping element (110, 210, 310), at least one elastic vestibular clamping element (120, 220, 320), and a film (130, 230, 330) connecting the elastic lip clamping element and the at least one elastic vestibular clamping element, wherein the clamping elements are arranged along two opposite end regions of the film, wherein the clamping elements (110, 210, 310; 120, 220, 320) are elastically deformable and span the film (130, 230, 330) in a relaxed state in the form of a ring or tube, wherein the vestibular clamping element (120, 220, 320) comprises at least one section (121, 221, 321) curved toward the lip clamping element in a longitudinal direction, said curved section extending anterior to a vestibular fold when the covering device is inserted,
wherein the at least one curved section (121, 221, 321) shortens the film (130, 230, 330) in a center of the at least one curved section (121, 221, 321) to 30 to 70 percent, compared to remaining regions of the film.

2. The covering device as claimed in claim 1,
wherein the vestibular clamping element (120, 220, 320), when the covering device is inserted, is spaced apart from the lip clamping element (110, 210, 310) by 0 mm to 30 mm in the region of the at least one section (121, 221, 321) curved toward the anterior.

3. The covering device as claimed in claim 2,
wherein the curved section (121, 221, 321) shortens the film (130, 230, 330) in a center of the curved section (121, 221, 321) to approximately 50 percent.

4. The covering device as claimed in claim 1,
wherein the at least one curved section (121, 221, 321) passes through a sagittal plane when the covering device is inserted.

5. The covering device as claimed in claim 1,
wherein the at least one curved section (121, 221, 321) takes up between 10 percent and 60 percent of a circumference of the elastic vestibular clamping element (120, 220, 320).

6. The covering device as claimed in claim 1,
wherein the at least one curved section (121, 221, 321) is substantially sinusoidal-shaped or double S-shaped.

7. A covering device for covering the lips and labial angles and for holding the lips, cheeks and labial angles away from rows of teeth in a mouth of a patient, comprising
an elastic lip clamping element (110, 210, 310) for external contact with a mouth opening,
at least one elastic vestibular clamping element (120, 220, 320) for inserting into an oral vestibule of the mouth of the patient, and
a limp film (130, 230, 330) connecting the lip clamping element and at least one elastic vestibular clamping element,
wherein the clamping elements are arranged along two opposite end regions of the film, wherein:
at least one clamping section (123, 223, 323) of the vestibular clamping element (120, 220, 320) is elastically deformable and spans the film (130) in a relaxed state and is suitable to be inserted into a region of the oral vestibule of the patient in a deformed state and to fix the film (130, 230, 330) intraorally,
wherein the vestibular clamping element (120, 220, 320) comprises at least one section (121, 221, 321) curved toward the lip clamping element in a longitudinal direction, said at least one curved section extending in a sagittal direction anterior to a vestibular fold when the covering device is inserted,
wherein two anteriorly curved sections (121, 221, 321, 122, 222, 322) of the vestibular clamping element (120, 220, 320) extend in the sagittal direction anterior to the vestibular fold and extend to both sides of the sagittal plane when the covering device is inserted, the first anteriorly curved section (121, 221, 321) extends in a region of canine teeth and incisors of a lower jaw and a second anteriorly curved section (122, 222, 322) extends in a region of canine teeth and incisors of an upper jaw.

8. The covering device as claimed in claim 7,
wherein, when the covering device is inserted, the film (130, 230, 330) extends between the lip clamping element (110, 210, 310) and the vestibular clamping element (120, 220, 320) in contact with the lips and labial angles and therearound and is adapted to exert substantially evenly distributed planar compressive forces to the lips and labial angles which push away the lips, cheeks and labial angles from the teeth and alveolar bone and pretension the mouth opening circularly into an opened position, wherein the covering device allows for closing the mouth.

9. The covering device as claimed in claim 7,
wherein the at least one anteriorly curved section (121, 221, 321) of the vestibular clamping element (120, 220, 320) rests on the lip or outside of the lip and/or extends in a region of incisors of a lower jaw when the covering device is inserted.

10. The covering device as claimed in claim 7,
wherein the vestibular clamping element (120, 220, 320) is configured as a clamping frame, in a shape of a clamping ring, which is plastically shaped in three dimensions.

11. The covering device as claimed in claim 7,
wherein the lip clamping element (210, 310) comprises at least one section (211, 311) which, when the covering device is inserted, is curved in the sagittal direction toward the at least one section of the vestibular clamping element (220, 320).

12. The covering device as claimed in claim 7,
wherein the covering device has a shape of a tube (101) with two ends (141, 142), in which at least a second end (142) of the tube (101) comprises two concave indentations (151, 152).

13. The covering device as claimed in claim 7,
wherein the elastic vestibular clamping element (120, 220, 320) is connected to the elastic lip clamping element (110, 210, 310) by at least one web (171, 271, 571, 172, 272, 572), wherein the at least one web (271, 272) is positioned in the region of the anteriorly curved section (121, 122, 221, 222, 321, 322) and/or the at least one web (271) comprises film material or of a material different therefrom.

14. A covering device for covering the lips and labial angles and for holding the lips, cheeks and labial angles away from rows of teeth in a mouth of a patient, comprising
an elastic lip clamping element (110, 210, 310),
at least one elastic vestibular clamping element (120, 220, 320), and
a film (130, 230, 330) connecting the lip clamping element and at least one elastic vestibular clamping element,
wherein the clamping elements are arranged along two opposite end regions of the film,
wherein the at least one vestibular clamping element (120, 220, 320) comprises at least one section (121, 221, 321) curved toward the lip clamping element in a longitudinal direction, said curved section extending anterior to a vestibular fold when the covering device is inserted,
wherein the clamping elements (110, 210, 310; 120, 220, 320) are elastically deformable and span the film (130, 230, 330) in a relaxed state in the form of a ring or tube,
wherein the vestibular clamping element (120, 220, 320) comprises at least four protrusions or protruding corners (512, 514, 516, 518) which protrude convexly toward an outside compared to a pointed oval (505) or oval, and wherein a shape of the vestibular clamping element (520) is incongruent with or geometrically dissimilar to the pointed oval (505) or oval.

15. The covering device as claimed in claim 14,
wherein, in a top view, the vestibular clamping element (520) has substantially a shape of a rectangle with rounded corners,
wherein a radius of the rounded corners is between 0.1 cm and 7 cm.

16. The covering device as claimed in claim 14,
wherein the lip clamping element (510) is congruent with or geometrically similar to the vestibular clamping element (520), or
wherein the lip clamping element (510) and the vestibular clamping element (520) deviate in shape from one another by less than 20%.

17. The covering device as claimed in claim 14,
wherein a radius of the corners is between 0.2 to 4 cm.

* * * * *